Figure 1:
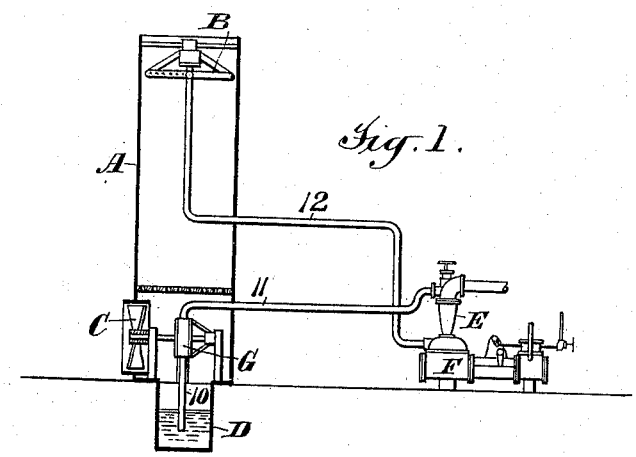

(No Model.)  2 Sheets—Sheet 1.
L. R. ALBERGER.
SELF COOLING CONDENSER OR SIMILAR APPARATUS.
No. 590,950. Patented Oct. 5, 1897.

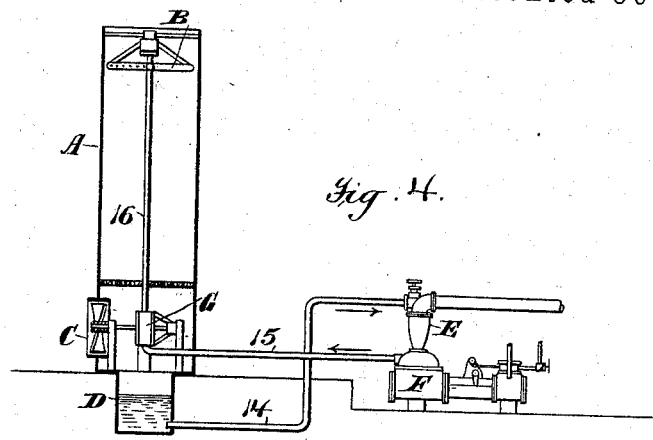
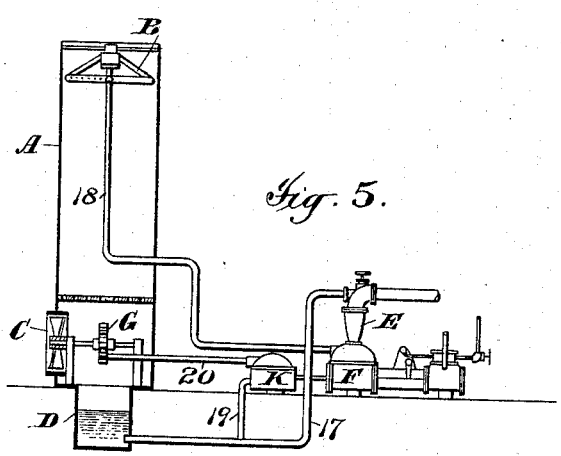
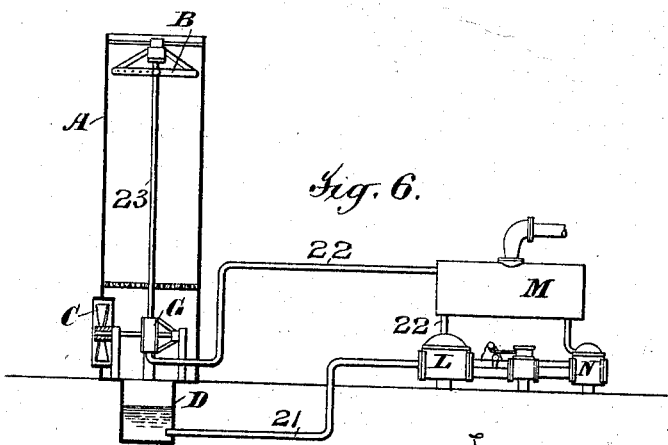

UNITED STATES PATENT OFFICE.

LOUIS R. ALBERGER, OF NEW YORK, N. Y., ASSIGNOR TO THE HENRY R. WORTHINGTON, OF ELIZABETH, NEW JERSEY.

SELF-COOLING CONDENSER OR SIMILAR APPARATUS.

SPECIFICATION forming part of Letters Patent No. 590,950, dated October 5, 1897.

Application filed February 8, 1896. Serial No. 578,483. (No model.)

*To all whom it may concern:*

Be it known that I, LOUIS R. ALBERGER, a citizen of the United States, residing at New York, county of New York, and State of New York, have invented certain new and useful Improvements in Self-Cooling Condensers or Similar Apparatus, fully described and represented in the following specification and the accompanying drawings, forming a part of the same.

This invention relates especially to that class of condensing apparatus in which the water or other liquid used for condensation is cooled and used over and over again in order to secure the benefit of condensation without a large natural water-supply and in which a fan or equivalent device is used for producing an air-current to secure the desired contact of the water to be cooled with air for the transfer of the heat to the air and consequent cooling of the water.

Such cooling apparatus in its preferred form consists of a structure of considerable height, to the top of which the water is raised and through which it falls in a finely-divided state in contact with an upward current of air, such structures being commonly known as "cooling-towers," and, when used in connection with a condensing apparatus, forming systems known as "self-cooling condensers."

The especial object of the present invention is to provide an improved condensing apparatus of this class by which the fan or equivalent device for producing the cooling-current of air is driven without the use of an extra fan-engine or the extensive driving connections which have been required in such constructions when, as is frequently necessary, the tower is placed at a considerable distance from the engine-room and by which the quantity of air forced through the tower is proportionate to the quantity of water circulated for cooling, and I secure this result by combining with the tower, fan, and condenser a fan-actuating water-motor of any suitable form, which is operated by means either of the circulating column of water or by a column of water moved or controlled in any other manner by the motor which circulates the water to be cooled, so that the action of the fan-actuating motor is controlled by and varies with the water circulated. While the invention relates especially to condensing apparatus, its broad features, however, are applicable also in connection with apparatus for bringing a liquid into intimate contact with air or other gas for other purposes than cooling liquid for use in condensing.

The broad features of the invention may be embodied in many different constructions, and for a full understanding of the invention a detailed description of constructions embodying the same in some of the preferred forms as applied in condensing apparatus will now be given in connection with the accompanying drawings, forming a part of this specification, and the features of the invention will be specifically pointed out in the claims.

Figure 2:
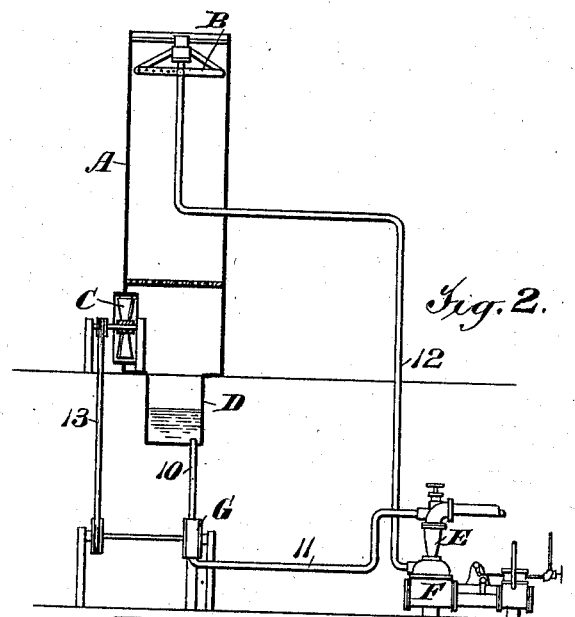
Figure 3:
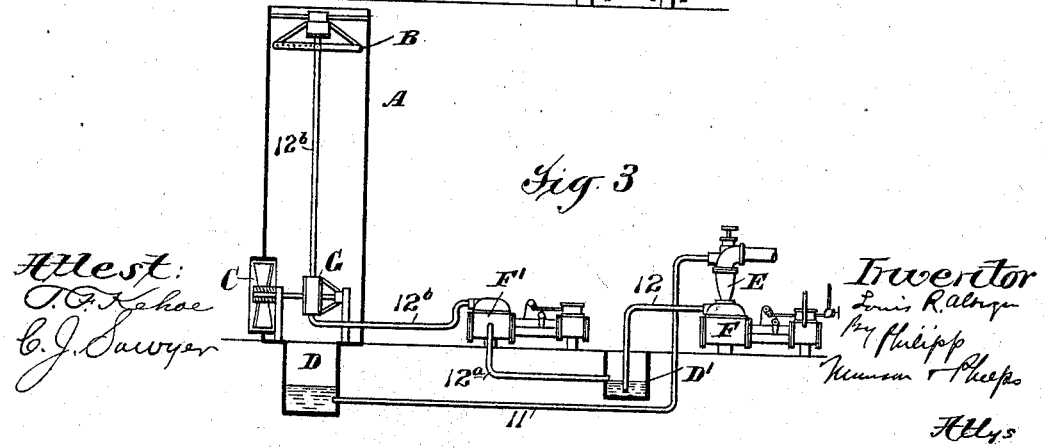

In the drawings, Figure 1 is a diagrammatic sectional elevation of a construction in which the fan is operated by the condensing water as it passes from the reservoir to a jet-condenser, the water-motor being placed above the reservoir and the water forced through it by the atmospheric pressure acting against the vacuum in the condenser. Fig. 2 is a similar view showing a construction in which the water-motor is placed below the reservoir, so as to be operated by the water-head plus atmospheric pressure acting against the vacuum in the condenser. Fig. 3 shows a construction in which separate pumps are used on the condenser and for raising the water to the top of the tower. Fig. 4 shows a construction in which the water-motor is actuated by the circulating column of condensing water as it passes from the condenser-pump to the top of the cooling-tower. Fig. 5 shows a construction in which the water-motor is operated by a column of water driven by a pump actuated from the steam-cylinders of the condenser-pump, the water returning from the water-motor to the reservoir. Fig. 6 shows a construction employing a surface condenser and air-pump in which the water-motor is operated by the column of condensing water as it passes from the condenser to the top of the cooling-tower.

In the drawings, A is the cooling-tower, which may be of any suitable construction such that the liquid falling through it is subdivided for the action of the air thereon and is not shown in detail, as such constructions are now well known.

B is the water-distributer at the top of the tower, C the fan at the base of the tower, D the reservoir to which the cooled water passes from the tower, E the condensing-chamber, and F the condenser-pump, all of which parts may be of the usual or any suitable construction. The water-motor G, by which the fan C is driven, may likewise be of any suitable construction, either a turbine, Pelton water-wheel, or of other form. In the construction shown in Fig. 1 this water-motor is placed in the air-chamber at the base of the tower and is operated by the water from the reservoir D passing to the water-motor through a pipe 10 and from the water-motor, after operating the latter, through the pipe 11 to a jet-condenser, and the water delivered from the condensing-chamber E being forced by the condenser-pump F through the pipe 12 to the distributer B at the top of the cooling-tower A. In this construction, therefore, it will be seen that the fan C is operated by water from the reservoir D, raised by atmospheric pressure against the vacuum in the jet-condenser, the water passing from the water-motor, which, in this instance, is preferably a turbine, to the condensing-chamber.

In the construction shown in Fig. 2 the water-motor G is placed some distance below the reservoir, so that the water passes downward through the pipe 10 to the motor, the other pipe connections 11 12 being the same as previously described. The shaft of the water-motor G in this construction is shown as connected to the fan C by a belt 13, but it may be connected in any other suitable manner. It will be seen that in this construction the water, as before, passes from the water-motor to the condenser, but the water passes to the water-motor under a head depending upon the distance of the water-motor below the level of the water in the reservoir D, atmospheric pressure also acting against the vacuum in the condensing-chamber E, as in the construction previously described. The apparatus shown in Fig. 1, however, is more economical than that shown in Fig. 2, because the vacuum in the condensing-chamber E is fully utilized for raising the water from the reservoir to the condenser, but the construction shown in Fig. 2 is well suited for constructions in which it is desirable to use an elevated tower—as, for instance, one on the roof of the building.

In Fig. 3 is shown a construction which may be used when, on account of the elevation of the tower or for any other reason, it is not desirable to use the same pump for maintaining the vacuum in the condenser and for raising the circulating water to the top of the tower. In this construction the water from the condenser-pump F is delivered through the pipe 12 to a tank or second reservoir D' instead of to the tower, and a second pump F' receives the water from the reservoir D' through suction-pipe 12$^a$ and delivers it to the distributer B at the top of the tower A through pipe 12$^b$, the fan water-motor G being placed upon this pipe 12$^b$. In this construction, therefore, the fan-motor is actuated by the column of water forced by the motor which circulates the condensing water. It is obvious that the pump-cylinder by which the water is raised to the top of the tower in this construction may, if desired, be operated by the steam-cylinders or other motor of the condenser-pump F by placing the pump-cylinder F' upon the motor of pump F, as shown in Fig. 5, or in any other suitable manner.

In the construction shown in Fig. 4 the condensing-chamber E receives its water directly from the reservoir D through pipe 14, and the water delivered from the condensing-chamber E is forced by the pump F through pipe 15 to the water-motor G and passes from the water-motor to the distributer B at the top of the tower through pipe 16. In this construction, therefore, the water-motor is operated by water forced by the condenser-pump, but, as before, the water from the water-motor returns to the reservoir and condenser.

In the construction shown in Fig. 5 the condensing-chamber E takes its water directly from the reservoir D through pipe 17, and the condenser-pump F delivers water directly to the distributer B through pipe 18. The water-motor is placed within the air-chamber at the foot of the tower, as in the constructions shown in Figs. 1 and 3, but instead of being operated by water passing from the condenser-pump is supplied from pump-cylinder K, operated by the same steam-cylinders or motor as the condenser-pump F, the water being received and delivered by said pump-cylinder K through pipes 19 20 and passing from the water-motor directly back to the reservoir D. In this construction a Pelton water-wheel may conveniently be used and will be found efficient.

All the constructions thus far described employ jet-condensers, but it is obvious that the broader features of the invention may be embodied also in constructions employing surface condensers. Such a construction is shown in Fig. 6, in which the circulating condensing water passes from the reservoir D to the condenser or circulating-pump L through pipe 21, and thence through pipe 22 to the condensing-chamber M and the water-motor G, and thence to the distributer B through pipe 23, the usual air-pump N being used in connection with the condenser.

It will be understood that other arrangements of condensing apparatus may be used to carry out the invention and that I am not to be limited to the specific form or arrangement of any of the constructions shown and that the feature of controlling the fan-motor by or in accordance with the water employed may be used with cooling-towers of other forms than that shown and for other purposes than cooling liquid for use in condensing.

The term "fan" is used herein for convenience to cover any suitable equivalent device for producing the air-current, and the terms "water" and "air" are intended to include any other suitable liquid or gas which may be used.

What I claim is—

1. The combination with a cooling-tower, fan, and motor for circulating the water to be cooled, of a fan-actuating water-motor and connections for supplying said fan-actuating water-motor with water from the supply of circulating water and whereby the water is returned from the water-motor to said supply, said connections being controlled by the water-circulating motor to increase and decrease the speed of the fan as the quantity of water circulated is increased and diminished, substantially as described.

2. The combination with the cooling-tower, fan, and motor for circulating the water to be cooled, of a fan-actuating water-motor operated by a column of water moved by said water-circulating motor, substantially as described.

3. In a self-cooling condenser, the combination with the cooling-tower, fan, and condensing-chamber, of a fan-actuating water-motor for operating said fan placed on the water-circulating connections, substantially as described.

4. In a self-cooling condenser, the combination with the cooling-tower and fan, of a jet-condensing chamber, a fan-actuating water-motor, and connections for the condensing water from the reservoir through the water-motor to the condensing-chamber, substantially as described.

5. In a self-cooling condenser, the combination with the cooling-tower and fan, of a jet-condensing chamber, a fan-actuating water-motor located on a higher plane than the reservoir of condensing water, and connections for the condensing water from the reservoir through the water-motor to the condensing-chamber, substantially as described.

6. The combination with the cooling-tower, fan, and motor for circulating the water to be cooled, of a fan-actuating water-motor located within the air-chamber at the base of the tower, and controlled by the water-circulating motor to increase and decrease the speed of the fan as the quantity of water circulated is increased and diminished, substantially as described.

In testimony whereof I have hereunto set my hand in the presence of two subscribing witnesses.

LOUIS R. ALBERGER.

Witnesses:
W. R. BRUSH,
GEO. M. VAN DOORN.